United States Patent
Potts

(10) Patent No.: US 6,951,302 B2
(45) Date of Patent: Oct. 4, 2005

(54) SYSTEM AND METHOD FOR PERFORMING A QUASI-CASH TRANSACTION

(75) Inventor: Craig K. Potts, Prior Lake, MN (US)

(73) Assignee: Cash Systems, Inc., Burnsville, MN (US)

( * ) Notice: Subject to any disclaimer, the term of this patent is extended or adjusted under 35 U.S.C. 154(b) by 0 days.

(21) Appl. No.: 10/383,169

(22) Filed: Mar. 6, 2003

(65) Prior Publication Data

US 2004/0173673 A1 Sep. 9, 2004

(51) Int. Cl.$^7$ ................................................ G06K 5/00
(52) U.S. Cl. ..................... 235/380; 235/375; 235/376; 235/381; 235/453; 235/487; 235/492; 235/493; 902/23; 902/27
(58) Field of Search .......................... 235/380, 375, 235/376, 381, 453, 487, 492, 493; 902/23–27; 463/16, 23, 25, 29, 1, 43, 42, 41, 40, 26, 27, 28, 17, 18, 19

(56) References Cited

U.S. PATENT DOCUMENTS

| | | | | |
|---|---|---|---|---|
| 4,689,742 A | * | 8/1987 | Troy et al. ...................... 463/25 |
| 4,764,666 A | * | 8/1988 | Bergeron ...................... 463/25 |
| 4,882,473 A | * | 11/1989 | Bergeron et al. ............. 463/25 |
| 5,179,517 A | * | 1/1993 | Sarbin et al. ................. 463/25 |
| 5,429,361 A | * | 7/1995 | Raven et al. .................. 463/25 |
| 5,642,160 A | * | 6/1997 | Bennett ....................... 348/156 |
| 5,663,546 A | | 9/1997 | Cucinotta et al. |
| 5,679,938 A | * | 10/1997 | Templeton et al. ......... 235/379 |
| 5,766,075 A | * | 6/1998 | Cook et al. ................... 463/25 |
| 5,864,623 A | * | 1/1999 | Messina et al. ............ 340/5.86 |
| 5,902,983 A | | 5/1999 | Crevelt et al. |
| 6,001,016 A | * | 12/1999 | Walker et al. ................. 463/42 |
| 6,275,991 B1 | | 8/2001 | Erlin |
| 6,347,738 B1 | | 2/2002 | Crevelt et al. |
| 6,352,205 B1 | | 3/2002 | Mullins et al. |
| 6,361,437 B1 | * | 3/2002 | Walker et al. ................. 463/23 |
| 6,486,768 B1 | * | 11/2002 | French et al. ............... 340/5.92 |
| 6,487,284 B1 | * | 11/2002 | Campbell .............. 379/144.04 |
| 6,709,333 B1 | * | 3/2004 | Bradford et al. .............. 463/29 |
| 6,800,029 B2 | * | 10/2004 | Rowe et al. .................. 463/25 |
| 2001/0022849 A1 | * | 9/2001 | Simonoff .................... 382/139 |
| 2002/0132664 A1 | * | 9/2002 | Miller et al. .................. 463/29 |
| 2003/0222153 A1 | * | 12/2003 | Pentz et al. ................. 235/493 |
| 2004/0214643 A1 | * | 10/2004 | Parrott et al. ................. 463/43 |
| 2005/0009600 A1 | * | 1/2005 | Rowe et al. .................. 463/29 |
| 2005/0054417 A1 | * | 3/2005 | Parrott et al. ................. 463/16 |

OTHER PUBLICATIONS

American Association of Motor Vehicle Administrators (AAMVA), document entitled "AAMVA National Standard for the Driver License / Identification Card—AAMVA DL/ID–2000"; 90 pgs; © 2000.

* cited by examiner

Primary Examiner—Karl D. Frech
Assistant Examiner—Daniel Walsh
(74) Attorney, Agent, or Firm—Dicke, Billig & Czaja, PLLC

(57) ABSTRACT

A system and method of performing a quasi-cash transaction for a customer including receiving a desired transaction dollar amount. A State identification card issued to the customer is electronically processed to retrieve machine readable information. Customer identification information is electronically parsed from the retrieved machine readable information. Quasi-cash document information is electronically generated utilizing the desired dollar amount and at least a portion of the parsed customer identification information. A quasi-cash document is printed, with the quasi-cash document including and displaying the generated quasi-cash document information. In one preferred embodiment, customer identification information parsed from the retrieved machine readable information includes customer name, customer address and identification card number information.

40 Claims, 6 Drawing Sheets

EXAMPLE ID CARD MACHINE READABLE INFORMATION (ASCII)

52a —— Track 1: %MNANYTOWN^JOHN JACK DOE^111 ANYSTREET?

52b —— Track 2: ;1234569999988888=021019680206040?

52c —— Track 3: # 55123    D    M072190    BRN    ?

Fig. 2

|  60 | 62 |
|---|---|
| State Identifier Code | FORMAT |
| AL ----- | Track 1 {....}<br>Track 2 {....}<br>Track 3 {....} |
| AK ---- | Track 1 {....}<br>Track 2 {....}<br>Track 3 {....} |
| . . . | |
| MNv1 ---- | Track 1 {....}<br>Track 2 {....} |
| MNv2 ---- | Track 1 {....}<br>Track 2 {....}<br>Track 3 {....} |
| . . . | |
| WY ---- | Track 1 {....}<br>Track 2 {....}<br>Track 3 {....} |

State Identifier Code
MNv2
⎣_60

FORMAT
⎣_62

Track 1:
{start sentinel} = position 1
{state identifier code} = positions 2,3
{city} = position 4-first delimiter;
 " " = "space"
{name} = second field (first delimiter-second delimiter);
 {FIRST MIDDLE LAST};
 " " = "space"
{address} = third field (second delimiter-end sentinel);
 " " = "space"

Track 2:
{start sentinel} = position 1
{id number, numeric component} = position8-first delimiter
{id number, Alpha prefix} = positions (end sentinel – 2), (end sentinel – 1);
{id number} = (Alpha prefix, numeric component}

Track 3:
{start sentinel} = position 1
{zip code} = positions 4-8

Fig. 4

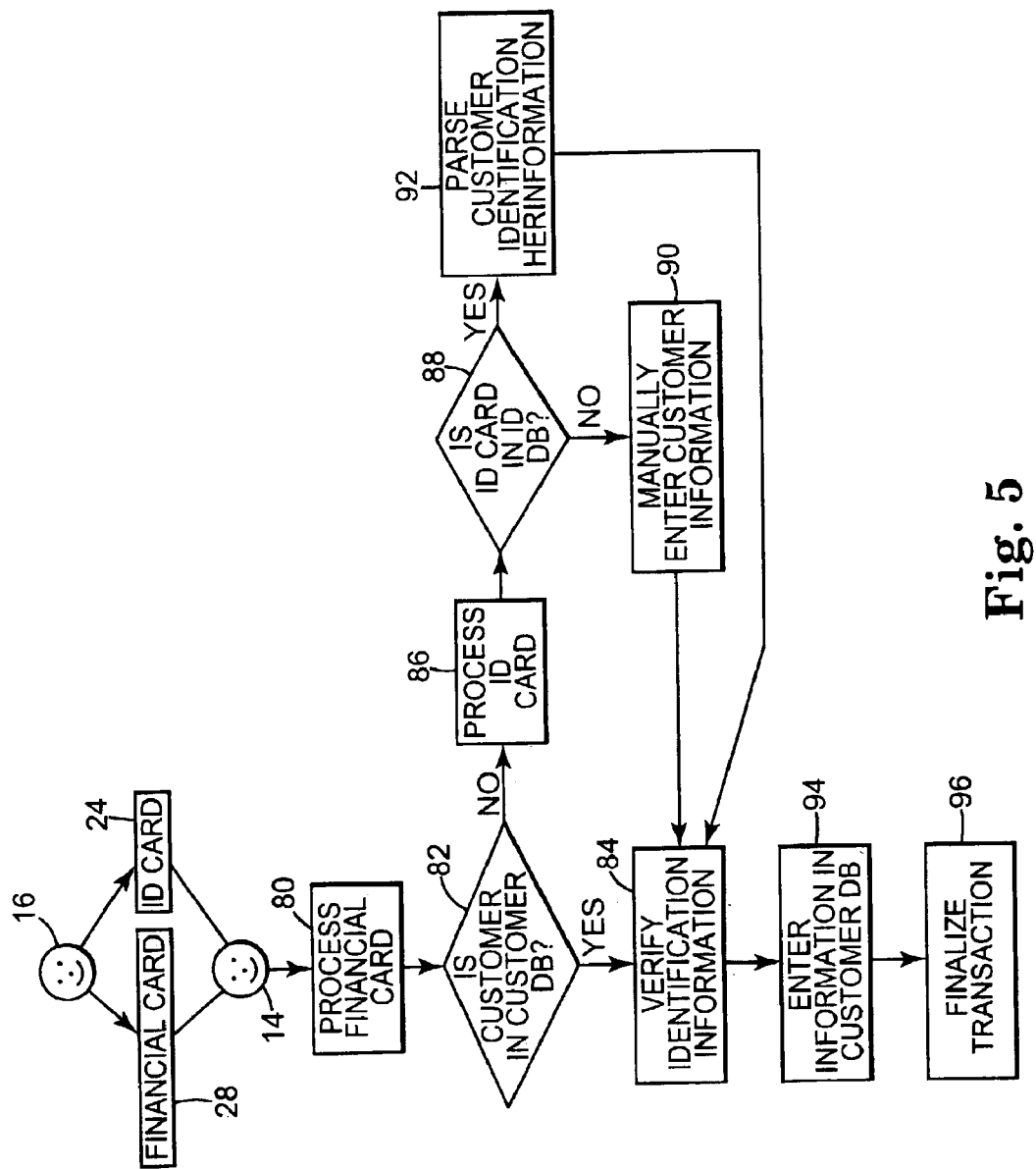

JOHN JACK DOE
111 ANYSTREET
ANYTOWN, MN 55123
State ID Number D999999888888

Payable in the amount of: five hundred dollars and no cents ($500.00)

JOHN JACK DOE

SYSTEM AND METHOD FOR PERFORMING A QUASI-CASH TRANSACTION

BACKGROUND OF THE INVENTION

The present invention relates to a system and method for performing a quasi-cash transaction for a customer. More particularly, it relates to a system and method, for use in various environments including a casino, adapted to generate a quasi-cash document utilizing electronically parsed information from a customer's State identification card.

Casino gaming is a highly popular activity in today's society. Often times, a particular individual's enjoyment of the casino gaming experience is predicated upon having a sufficient supply of money that in turn allows the patron to participate in gaming activities for a desired length of time. In a most basic form, the customer simply brings a sufficient amount of currency (or "cash") with him/her to the casino that can be exchanged for negotiable chips/casino-issued gaming cards and/or used with various gaming machines. Invariably, a customer may forget to bring a desired amount of currency with him/her to the casino, and/or depletes the supply of currency brought to the casino before he/she is ready for their gaming experience to end. Under these circumstances, the customer will desire to access additional monies otherwise available through one or more financial institutions at which the customer maintains an account. For example, the customer can utilize an automatic teller machine ("ATM") located on the casino's premises.

An additional mechanism by which a casino customer can access an off-site financial account is via a cash advance transaction from a credit-type account owned by the customer. Most casinos are equipped to handle cash advance transactions, whereby the customer presents a financial institution card to a casino employee. As used throughout this specification, the phrases "financial institution card" or "financial card" are in reference to a credit card, debit card, or bank card. To this end, casinos often provide a central "cage" station at which a teller is available for processing a financial card cash advance transaction. Regardless, the customer's financial card is processed by a designed electronic processing unit that is otherwise connected (such as via a phone line) to a financial transaction processing service provider. The service provider automatically reviews the relevant financial card information and desired cash advance amount, and either authorizes or denies the requested transaction. If approved, the casino employee (or other person designated by the casino for performing cash advance transactions, such as third party cash advance cash advance service provider) then prepares a quasi-cash document for the customer to execute and then exchange for cash and/or casino-issued chips or gaming card (e.g., a magnetic swipe card issued by the casino that, via interaction with a central database, maintains a credit account for the customer with the casino). In general terms, and as is known in the art, a quasi-cash document is akin to a check or money order and represents a negotiable instrument once signed by the customer. Thus, the quasi-cash document must include not only the cash advance dollar amount, but also customer identification information including full name, street address, and in some instances state identification number (e.g., driver license number) and telephone number.

While the casino employee (or other designated person/ service provider) likely has access to a computerized system that facilitates automatic printing of the quasi-cash document, the customer identification information must be manually entered into the system by the casino employee. Unfortunately, this can be a relatively time-consuming task, especially where the customer has a unique name and/or address. In this regard, it is commonplace for multiple casino customers to virtually simultaneously desire to perform a cash advance transaction. Thus, even if the manual entry of customer identification information requires only a few minutes of the casino employee's time, where several patrons are waiting in line, the cumulative delay can become discouraging. Clearly, casinos have a vested interested in maintaining a high level of customer satisfaction, but also to avoid situations that might otherwise dissuade a customer from obtaining additional funds that in turn are used to participate in casino gaming activities.

Financial institution card cash advance transactions are a common place in casinos. However, existing cash advance systems require manual entry of customer identification information as part of the quasi-cash document generating process. This requirement entails unacceptable delays in completing an individual transaction. Therefore, a need exists for a system and method of performing a quasi-cash transaction for a customer, such as a casino customer, in an expedited fashion.

SUMMARY OF THE INVENTION

One aspect of the present invention relates to a method of performing a quasi-cash transaction for a customer. The method includes receiving information from the customer relating to a desired transaction dollar amount. A State identification card issued to the customer is electronically processed to retrieve machine readable information stored on the State identification card. Customer identification information is electronically parsed from the retrieved machine readable information. Quasi-cash document information is electronically generated utilizing the desired dollar amount and at least a portion of the electronically parsed customer identification information. Finally, a quasi-cash document is printed, with the quasi-cash document including and displaying the generated quasi-cash document information. In one preferred embodiment, the parsed customer identification is the customer's name. In another preferred embodiment, additional customer identification information is parsed from the retrieved machine readable information, including customer address. In yet another preferred embodiment, processing of the machine readable information includes determining a format of the machine readable information based upon reference to a database.

Another aspect of the present invention relates to a system for performing a quasi-cash transaction for a customer. The system includes a card reader, a processor, and a printer. The card reader is adapted to read machine readable information stored on a State identification card issued to the customer. The processor is electrically connected to the card reader and is adapted to receive information from the customer relating to a desired transaction dollar amount and receive the machine readable information from the card reader. Further, the processor is adapted to parse customer identification information from the machine readable information, and to generate quasi-cash document information based upon the desired dollar amount and the parsed customer identification information. Finally, the printer is electrically connected to the processor and is adapted to print a quasi-cash document based upon the generated quasi-cash document information as provided by the processor. In one preferred embodiment, the card reader is further adapted to read machine readable information stored on a financial institution card provided by the customer, and the processor is adapted to perform a transaction approval operation. In another preferred embodiment, the processor is adapted to recognize a format of the machine readable information based upon reference to a database maintained by the processor.

Yet another aspect of the present invention relates to a method of performing a quasi-cash transaction for a customer in a casino. The method includes receiving information from the customer relating to a desired transaction dollar amount. A State identification card, otherwise issued to the customer, is delivered from the customer to a casino designee. The casino designee operates a card reader to retrieve machine readable information stored on the State identification card. Customer identification information is then electronically parsed from the retrieved machine readable information. Quasi-cash document information is electronically generated utilizing the desired dollar amount and the electronically parsed customer identification information. A quasi-cash document is then printed that includes and displays the quasi-cash document information. Finally, the casino designee delivers the quasi-cash document to the customer. In one preferred embodiment, the customer executes and exchanges the quasi-cash document for a cash or casino-issued negotiable instrument such as chips or casino gaming card.

BRIEF DESCRIPTION OF THE DRAWINGS

FIG. 2 is a schematic illustration of machine readable information, in ASCII format, provided by an exemplary State identification card;

FIG. 3 is a block diagram illustrating an identification card database in accordance with one embodiment of the present invention provided with a processor component of the system of FIG. 1;

FIG. 4 is a block diagram illustrating exemplary entries associated with the database of FIG. 3;

FIG. 5 is a flow diagram of a method in accordance with the present invention; and FIG. 6 is an illustration of an exemplary quasi-cash document generated by the system and method of the present invention.

DETAILED DESCRIPTION OF THE PREFERRED EMBODIMENTS

Figure 1:
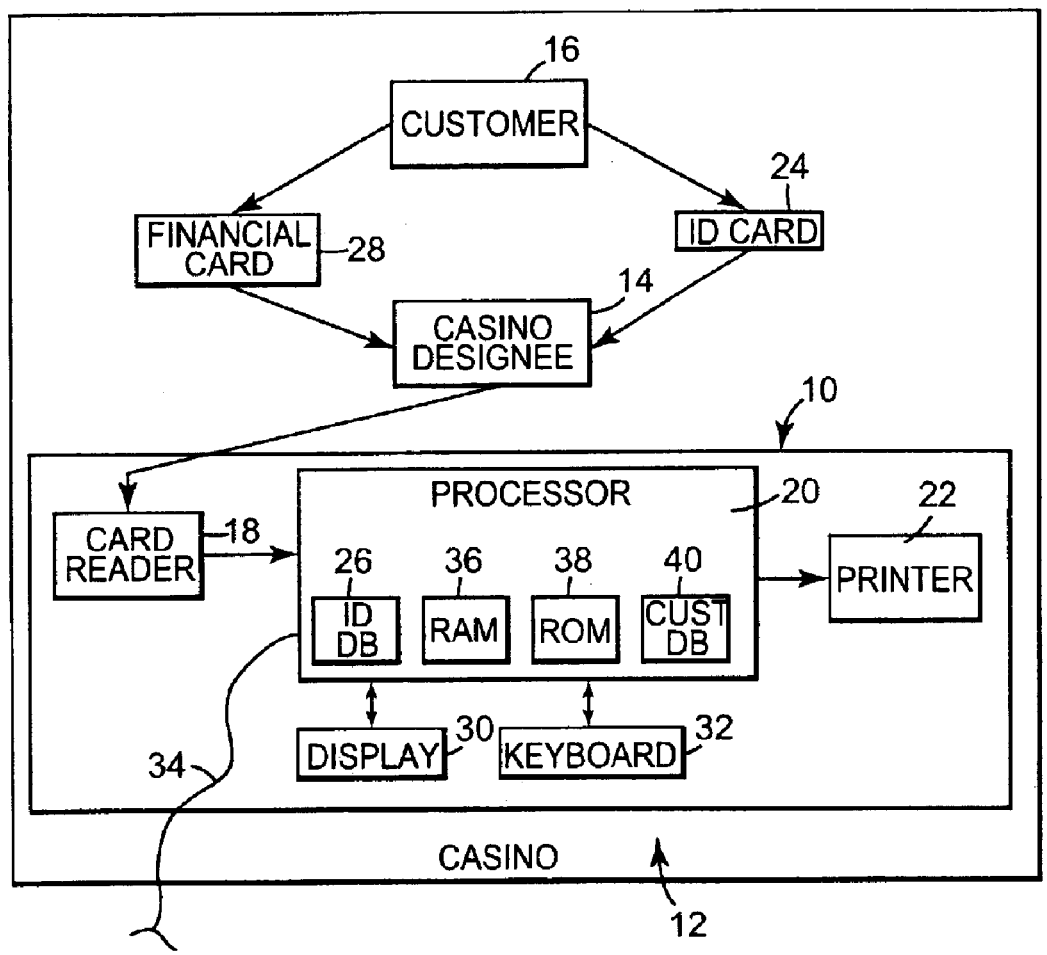
FIG. 1 is a block diagram of a quasi-cash transaction system in accordance with an embodiment of the present invention.

One embodiment of a quasi-cash transaction system 10 in accordance with the present invention is shown in block form in FIG. 1. In a preferred embodiment, the quasi-cash transaction system 10 is utilized within a casino 12 at which a casino designee 14 (e.g., casino teller, pit boss, runner, employee of a third party cash advance service provider, etc.) facilitates the quasi-cash transaction for a customer 16. Alternatively, the system 10 of the present invention may be utilized in other environments. Regardless, the system 10 preferably includes a card reader 18, a processor 20, and a printer 22. These components are described in greater detail below. In general terms, however, the card reader 18 and the printer 22 are electrically connected to the processor 20. As part of a quasi-cash transaction, the casino designee 14 obtains a State identification card 24 from the customer 16. As described below, the State identification card 24 provides identification information in a machine readable form. The card reader 18 is operated to retrieve the machine readable information from the State identification card 24, with this information being signaled to the processor 20. The processor 20, in turn, compares the retrieved machine readable information with formatting information provided by an identification card database 26 (denoted as "ID DB" in FIG. 1). Based upon this comparison, the processor 20 parses desired customer identification information from the retrieved machine readable information, and generates quasi-cash document information based upon the parsed information. The processor 20 prompts the printer 22 to print an appropriate quasi-cash document (not shown) that otherwise includes and displays the parsed customer information. The casino designee 14 then delivers the quasi-cash document to the customer 16. In one preferred embodiment, the parsed customer identification information is stored in a database (described below) for reference in future transactions. Unlike existing cash advance transaction techniques, the system and method of the present invention preferably does not require the casino designee 14 to manually enter customer identification information as part of the quasi-cash document generation process.

The card reader 18 is of a type known in the art and is adapted to read and decode machine readable information stored on a State identification card 24. In this regard, the State identification card 24 can assume a wide variety of forms, but is generally in reference to an identification card, such as a driver's license, issued by a State of the United States of America. To this end, most State identification cards provide identification information in machine readable form. Exemplary technologies for presenting this machine readable information include magnetic stripe, integrated circuit, finger imaging, optical memory, bar code (two-dimensional), and digital images. The card reader 18 is thus adapted to read and decode information provided by the particular card technology. Magnetic stripe and bar code techniques are most common, such that the card reader 18 is preferably a magnetic card swipe reader that reads and decodes information on the magnetic strip provided by the State identification card 24. The card reader 18 sends information to a decode logic module (not shown) which converts a serial bit stream from the card reader 18 into a byte-wide stream for input to the processor 20. Alternatively, the card reader 18 can be a "dip" card reader, etc. Because most financial cards also include a magnetic stripe with machine readable information, the card reader 18 is further preferably adapted to read and decode information from a financial card 28 of the customer 16.

The processor 20 is a microprocessor-based device, capable of storing information and performing desired operations. In this regard, the processor 20 preferably includes and/or is connected to a display screen 30, a keypad 32, a transmission line 34, RAM 36, ROM 38, and the identification card database 26. The software used to control operation of the processor 20 is stored in the ROM 38. Further, the identification card database 26 (as well as other databases such as a customer database 40) are preferably stored in the ROM 38 (it being noted that FIG. 1 illustrates the identification card database 26 and the customer database 40 separate from the ROM 38 for ease of illustration). Conversely, information entered via the display 30, the keypad 32, and/or the card reader 18 is stored by the processor 20 in the RAM 36 for further processing. To this end, the display 30 and the keypad 32 are of types known in the art and can assume a variety of forms. For example, the keypad 32 can be a keyboard, and the display 30 can be a touch-screen display. One or both of the display 30 and/or the keypad 32 can be eliminated depending upon desired operation of the system 10. Finally, the transmission line 34 provides a communication link to off-site resources, such as a financial transaction processing service provider, for example Vital Processing Services of Tempe, Ariz.

Operation of the processor 20 to process financial card information is known. However, electronic processing of State identification card information in accordance with the present invention represents a distinct advancement in the art. In general terms, the processor 20 is adapted to parse desired customer identification information from the State identification card 24 (as otherwise read and decoded by the card reader 18) based upon reference to the identification card database 26. As described in greater detail below, the identification card database 26 preferably includes a listing of format designations for identification cards associated with multiple States (preferably, the identification card database 26 includes formatting designations for all fifty States) or other identification card issuing bodies.

As a starting point, the American Association of Motor Vehicle Administrators (AAMVA) has established certain general formatting standards for machine readable information stored on a State identification card. These standards are outlined in a publication entitled "AAMVA National Standard for the Driver's License/Identification Card" (2000), commonly referred to as "AAMVA DL/ID 2000". As previously described, virtually all current State identification cards present the machine readable information via a magnetic stripe or a bar code. In this regard, current magnetic stripe technology presents three tracks containing certain identification information; bar codes are typically read in a two-dimensional format. The AAMVA DL/ID 2000 recites required and optional data elements for each of the tracks, as well as preferred format conventions. Within each required data element and format convention, however, numerous variations are acceptable such that a universal "standard" does not exist. In fact, the formatting of the machine readable information distinctly varies from State-to-State. Thus, the processor 20 must be adapted to recognize the originating State of the customer's State identification card 24 and, based upon reference to the identification card database 26, determine the formatting utilized by the particular State identification card 24 and thus the "location" of relevant information.

For example, FIG. 2 presents a decoded listing of the machine readable information (in ASCII format) provided by a hypothetical State identification card issued by the State of Minnesota. The machine readable information (referenced generally at 50) is presented in three tracks 52a, 52b, and 52c. With respect to track 1 (52a), a series of ASCII characters are presented. Each character occupies a designated data stream location position. For example, the character "%" is located at Position Number 1, whereas the character "?" is located at Position Number 40 (with the one example of FIG. 2). Pursuant to the AAMVA DL/ID 2000 standards, certain characters are designated as sentinels and other characters represent field delimiters. AAMVA DL/ID 2000-accepted ASCII sentinels include "%", ";", "#" as start sentinels; "?" as an end sentinel; "^" and "=" as field delimiters. With these designations in mind, the converted ASCII character associated with Track 1 (52a) of FIG. 2 includes the start sentinel "%" at Position Number 1. Position Numbers 2 and 3 provide a state identifier code ("MN" in the example of FIG. 2). Following the state identifier code, the remaining characters up to the first field delimiter (the first "^" at position 12 in FIG. 2) represent the city component of the cardholder's address. Thus, with respect to the example of FIG. 2, the cardholder's city is "ANY-TOWN" (provided by the characters in Positions 4–11). In effect, the information presented between the start sentinel ("%") and the first field delimiter ("^") can be designated as {Field 1}.

The characters presented between the first field delimiter (the "^" at Position 12) and the second field delimiter (the "^" at Position 26) represents {Field 2}, and provides the cardholder's name. Thus, with respect to the example of FIG. 2, Track 1 (52a) recites that the cardholder's name is "JOHN JACK DOE". This name format/convention (e.g., first middle last) is not an AAMVA requirement. In fact, many states utilize differing formats/conventions (e.g., last first middle). Further, the use of a blank space between the name components (e.g., the blank character spaces at Track 1 Positions 17 and 22 in the example of FIG. 2) is not universally employed. For example, identification cards issued by the State of Ohio employ a "$" instead of a blank space (e.g., the name formatting for Ohio is "last$first$MI").

Finally, the characters presented between the second field delimiter (e.g., the "^" at Position 26) and the stop sentinel (e.g., the "?" at Position 40) is designated as {Field 3} and provides the cardholder's street address. Thus, with reference to the example of FIG. 2, the cardholder's street address is "111 ANY STREET". Once again, the presentation of the street address information varies from state-to-state. For example, where the cardholder's street address includes a P.O. Box number, some states (such as Wisconsin) do not include the ASCII characters "P.O. Box". Thus, where the cardholder's street address is "P.O. Box 123", a State identification card issued by the State of Wisconsin will only provide "123" in the {Field 3}, whereas other states will include "P.O. Box 123".

Track 2 (52b of FIG. 2) typically includes information relating to Federal/State Identification Code, identification card number, expiration date, and date of birth. With reference to the example of FIG. 2, following the start sentinel (";" at Position 1), the next six characters (Positions 2–7) provide the Federal or State Identification Code ("123456" with the example of FIG. 2). Identification card number information is then provided. In this regard, formatting of the identification card number varies greatly from state-to-state. The difficulty in accurately designating the identification card number form the Track 2 data stream is further complicated by the fact that, pursuant to AAMVA DL/ID 2000 standards, Track 2 (52b) normally does not include alpha characters; however, the actual identification card number assigned by the issuing body (e.g., the State that issues the identification card) oftentimes does include at least one alphabetic character (typically an alpha prefix). For example, the identification card number associated with the example of FIG. 2 is "D999999888888". The numeric component is found following the Federal Identification Code (e.g., beginning at Position 8) through the field delimiter ("=" at Position 20). With Minnesota State identification cards, the alpha prefix component is presented in numeric form via the two numbers appearing immediately before the stop sentinel ("?" at Position 35 in FIG. 2). With reference to the example of FIG. 2, then, the two numbers found immediately preceding the stop sentinel are "04" (Positions 33 and 34). The numeric "04" translates to the letter "D". Once again, this is but one formatting convention. For example, many states employ a two letter alpha prefix for the identification card number; under these circumstances, one or both of these alpha prefix characters can be represented in numeric form within Track 2. Further, the location of the alpha prefix designator varies from state-to-state. For example, Ohio puts both alpha prefix numeric designations at the front of the numeric component of the identification number. Regardless, following the field delimiter ("="), expiration date and date of birth information are provided. With respect to the example of FIG. 2, Minnesota designates the expiration date information in Track 2 as (MMYY), such that the exemplary identification card of FIG. 2 expires in Feb. 2010 (i.e., "0210" at Positions 21–24). Other states may include a century designation and/or a day of month of expiration. Similarly, representation of the cardholder's date of birth may also vary. With respect to the example of FIG. 2, the date of birth information is presented at Positions 25–32, and is found to be "19680206", representing a date of birth of Feb. 6, 1968. Other states may not include reference to the century and/or may change a positioning of the day, month, and/or year formatting.

Finally, Track 3 (52c) is not found on many State-issued identification cards. For those State identification cards that do provide a Track 3, of particular interest is the zip code information presented a certain number of positional spaces after the start sentinel ("#"). Minnesota State identification cards, for example, provide the zip code three positional spaces after the start sentinel (e.g., Positions 4–8). Thus, with the example of FIG. 2, the cardholder's zip code is "55123". Other States locate the zip code, along with other information, at differing locations in Track 3 and/or in other tracks (especially where the particular State identification card machine readable information technology does not provide three tracks).

As described below, the system and method of the present invention addresses the wide-ranging differences in identification card information formatting to provide a universally applicable system (i.e., not limited to reviewing identification card information from a only one State). An additional complication addressed by the system and method of the present invention is that many states have issued multiple identification card versions having varying machine readable information formatting. Over time, with the evolution of technology, more information can be supplied within the machine readable component of an issued State identification card. However, it is impossible to remove "older" versions from circulation. Thus, for example, Minnesota has two identification card versions currently available, with the older version (Version 1) providing only two tracks and the new version (Version 2) providing three tracks. The Version 1 identification information formatting does not correlate with the Version 2 formatting.

With the above designations in mind, the identification card database 26 (FIG. 1) associated with the processor 20 (FIG. 1) of the present invention preferably provides a listing of all available State identification cards and corresponding track formatting. In this regard, FIG. 3 provides an enhanced representation of information provided with the database 26. Each entry within the database 26 includes a state identifier code (represented generally at column 60) that is matched with machine readable information formatting associated with that state's identification card (represented generally at column 62). In a preferred embodiment, the database 26 includes entries for all fifty States, as well as other regions/entities that issue standard identification cards (e.g., District of Columbia, Puerto Rico, military, etc.). Alternatively, formatting for less than all fifty States can be provided. Preferably, however, the database 26 includes entries for at least twenty-five different State identification cards. As shown in FIG. 3, the state identifier code "AL" is the first entry under the state identifier code column 60, representing an identification card issued by the State of Alabama. The formatting column 62 provides the track formatting details associated with an Alabama identification card. In other words, the formatting designations associated with an Alabama-issued identification card include, for example, the location and ordering of first, middle, and last name components in Track 1; the location and ordering of address components in Track 1; the formatting of identification card number in Track 2; etc., are provided. FIG. 3 further reflects the preferred embodiment in which the database 26 includes formatting peculiarities associated with a state having two or more identification card versions in circulation. In particular, FIG. 3 illustrates entries for two versions of Minnesota-issued identification cards.

Specific formatting designations for an exemplary Version 2 Minnesota-issued State identification card, otherwise provided within the format column 62, are shown in FIG. 4. The Version 2 Minnesota State identification card includes three tracks. For each track, specific formatting conventions associated with the Version 2 Minnesota State identification card is provided. For example, with respect to Track 1, the formatting requirements designate a start sentinel at ASCII Position 1; a state identifier code at ASCII Positions 2–3; city identification at ASCII Position 4 through a first delimiter; name identification components at ASCII characters between the first and second delimiters; and address and identification at ASCII characters between the second delimiter and the end sentinel. Within each designated field, formatting details are further provided (e.g. the ordering of name components, identifying unique characters such as a "blank" ASCII position, etc.). Similar formatting conventions are provided for Tracks 2 and 3. Once again, because most states have certain formatting idiosyncrasies, each format recited in the database 26 will be unique to an issuing state and/or version.

During use, and with reference to FIG. 1 and the simplified flow diagram of FIG. 5, the customer 16 approaches the casino designee 14 to initiate a quasi-cash transaction (e.g., a cash advance transaction). The customer 16 provides the casino designee 14 with their financial institution card 28 and State identification card 24. At step 80, the casino designee 14 processes the financial institution card 28 in a known fashion. For example, the casino designee 14 "swipes" the financial institution card 28 through the card reader 18, and enters a desired transaction dollar amount via the keyboard 32 and/or the display 30 (where the display 30 is a touch-screen display). The processor 20 performs a transaction authorization routine whereby the financial institution card 28 information and desired dollar amount are signaled, via the transition line 34, to a financial transaction processing service provider that authorizes or denies the desired transaction. Assuming the desired transaction is authorized, the processor 20 references the customer database 40 to determine whether identification information associated with the customer 16 (recognized via processing of the financial card 28 above) is available at step 82. If the customer identification information is already available to the processor 20, the transaction information is generated and verified at step 84, as described in greater detail below. If sufficient customer identification information is not available (e.g., the customer 16 is not listed in the customer database 40 or the information saved in the customer database 40 does not include entries for all categories required for the quasi-cash document), the casino designee 14 processes the State identification card 24 at step 86.

In particular, the casino designee 14 operates the card reader 18 to process the machine readable information provided with the State identification card 24. Once again, this machine readable information can be provided in a variety of formats, but is conventionally provided as a magnetic stripe or bar code. The card reader 18 decodes the machine readable information (e.g., hexadecimal machine readable information) provided with the State identification card 24 into an ASCII format, with this data stream being signaled to the processor 20. The processor 20, in turn, determines whether the state/entity otherwise issuing the State identification card 24 is available in the identification card database 26 at step 88. In particular, the processor 20 retrieves the state identifier code found in Track 1 of the machine readable information. As previously described, the state identifier code is a two-alpha character component found at Positions 2 and 3 of Track 1 (e.g., with reference to the example of FIG. 2, the state identifier code immediately follows the start sentinel in Track 1). The so-identified state identifier code is then compared with the listings provided in the identification card database 26. For example, with reference to FIG. 3, the state identifier code column 60 is reviewed to determine whether the state identifier code associated with the processed State identification card 24 is available. To this end, where the identification card database 26 indicates that a particular state has multiple State identification card versions, the processor 20 further determines a version of the particular State identification card 24 being processed and whether formatting for that version is available within the identification card database 26. For example, with reference to FIG. 3, where a determination is made that the particular State identification card 24 is a Minnesota identification card, the processor 20 reviews the data stream provided by the card reader 18 to determine whether two or three tracks are present. If three tracks are present, the processor 20 concludes that the State identification card 24 is a Minnesota Version 2 State identification card; where only two tracks are present, Version 1 is designated. Depending upon the multiple version formats employed by a particular State, the processor 20 can determine a version of the State identification card in other manners.

If, at step 88, it is determined that the identification card database 26 does not include formatting information relating to the particular State identification card 24, the casino designee 14 is prompted, at step 90, to manually enter customer identification information via the keyboard 32 and/or the display 30. Conversely, where the identification card database 26 does provide formatting information for the State identification card 24 being processed, requisite customer identification information is parsed from the data stream at step 92.

In particular, the processor 20, with reference to the formatting requirements identified by the identification card database 26, reviews the information presented in Tracks 1, 2, and 3 (where three tracks are present). In this regard, the customer identification information required for a "complete" quasi-cash document can vary, but will normally include at least the customer's 16 name. The customer's name must be presented in propering order (e.g., first name, middle name, last name); based upon the formatting parameters presented by the identification card database 26, the processor 20 will accurately parse each component of the customer's name from Track 1 and assign proper order to the parsed customer name information, regardless of the unique presentation of customer name information employed by the State issuing the State identification card 24.

Additional customer identification information can also be parsed from the track data streams, including, for example, address, identification card number, expiration date, date of birth, telephone number, etc. In a most preferred embodiment, the customer's full name, address and identification card number are parsed. The identification card database 26 facilitates the processor 20 accurately parsing this information and storing in proper order, along with addressing idiosyncrasies of certain State identification card formatting. For example, where the identification card number includes an alpha prefix component and the associated Track 2 data stream presents the alpha prefix in numeric form offset from the numeric component, the processor 20, based upon reference to the identification card database 26 formatting instructions, parses the alpha prefix component, converts to alphabetic form, and properly orders the alpha prefix relative to the parsed numeric component.

The desired, parsed customer identification information (or the customer identification retrieved from the customer database 40 at previous step 82) is then verified by the casino designee 14 at step 84. In particular, the processor 20 generates quasi-cash document information required for proper issuance of a quasi-cash document. To ensure that the later-printed quasi-cash document is accurate, the casino designee 14 verifies the information, such as by reviewing the generated quasi-cash document information via the display 30. If errors are noted and/or if additional information is needed, the casino designee 14 can manually enter/edit the information, such as via the keyboard 32 and/or the display 30. Further, and in one preferred embodiment, the casino designee 14 verifies that a photograph appearing on the State identification card 28 is that of the customer 16.

Once the quasi-cash document information has been verified, the customer identification information is preferably stored in the customer database 40 provided by the processor 20 at step 94. Subsequently, the quasi-cash transaction is finalized at step 96.

In particular, the quasi-cash document information, as otherwise generated by the processor 20, is formatted in conjunction with the desired (and approved) dollar amount for printing on a quasi-cash document. An exemplary quasi-cash document is shown at 100 in FIG. 6. The quasi-cash document 100 includes the desired transaction dollar amount, along with the customer identification information, as retrieved from the machine readable information associated with the State identification card 24. Thus, the quasi-cash document 100 will preferably include the customer's name, with name components presented in proper order, and possibly other relevant information, such as address, identification card number, data of birth, etc. To this end, the appearance of the customer identification information can vary from that shown in FIG. 6. For example, the customer's last name can appear first, a middle initial provided, etc. Because the system and method of the present invention is able to accurately assign the parsed information into desired categories (e.g., first name, last name, city, zip code, identification card number, etc.), the identification information on the quasi-cash document 100 can be accurately presented in any desired format. Notably, the customer identification information displayed on the quasi-cash document 100 need not include all information parsed from the identification card 24.

The processor 20 prompts the printer 22 to print the quasi-cash document 100. Once printed, the quasi-cash document 100 is presented to the customer 16 in an un-signed form. The customer 16 can then, if he/she so chooses, execute the quasi-cash document 100 and provide it to the casino designee 14 who then exchanges the executed quasi-cash document 100 for cash and/or casino-issued negotiable items (e.g., chips, casino gaming card, etc.).

The system and method of the present invention provides a distinct improvement over previous configurations. In particular, the time requirements for performing a quasi-cash transaction (such as a cash advance transaction) are greatly minimized as necessary customer information need not be manually entered. In this regard, the system and method of the present invention preferably accounts for all formatting idiosyncrasies associated with the multitude of issued State identification cards. In one preferred embodiment, a customer database is automatically provided with customer identification information parsed from a State identification card.

Although the present invention has been described with reference to preferred embodiments, workers skilled in the art will recognize that changes can be made in form and detail without departing from the spirit and scope of the present invention. For example, with the system and method of the present invention has been described in the context of a casino, other environments are equally acceptable. For example, the quasi-cash transaction can be performed in other locales, such as a racetrack, bingo parlor, nightclub, etc.

What is claimed is:

1. A method of performing quasi-cash transactions for customers, the method comprising:

receiving information from a first customer relating to a desired transaction dollar amount;

electronically processing a first driver license issued by a State of the United States of America to the first customer to retrieve machine readable information stored on the first driver license;

electronically parsing first customer identification information from the retrieved machine readable information;

electronically generating first customer quasi-cash document information utilizing the desired transaction dollar amount and at least a portion of the electronically parsed first customer identification information;

printing a first quasi-cash document that displays the generated first customer quasi-cash document information;

receiving information from a second customer relating to a desired transaction dollar amount;

electronically processing a second driver license issued by a State of the United States of America to the second customer to retrieve machine readable information stored on the second driver license, wherein a formatting of the machine readable information of the second driver license differs from that of the first driver license;

electronically parsing second customer identification information from the machine readable information retrieved from the second driver license;

electronically generating second customer quasi-cash document information utilizing the desired transaction dollar amount received from the second customer and at least a portion of the parsed second customer identification information; and printing a second quasi-cash document that displays the second customer quasi-cash document information.

2. The method of claim 1, wherein electronically processing the first driver license includes:

determining whether the first driver license includes machine readable information.

3. The method of claim 1, wherein electronically processing the first driver license includes determining whether the machine readable information stored on the first driver license is in a known format.

4. The method of claim 3, wherein the method further includes:

providing a database of a plurality of State identification card machine readable information formats each having a State code identifier; and further wherein determining whether the machine readable information stored on the first driver license is in a known format includes comparing a State code identifier of the machine readable information with the database.

5. The method of claim 4, further comprising:

prompting manual entry of customer information when a format of the machine readable information stored on the first driver license is not known.

6. The method of claim 1, wherein processing the first driver license includes determining a format of the machine readable information stored on the first driver license.

7. The method of claim 6, wherein the machine readable information is stored on the first driver license in a plurality of tracks, including a first track having a first track data stream, and further wherein determining a format of the first driver license machine readable information includes:

extracting a State code identifier from the first track data stream; and designating a format of the first driver license machine readable information based upon the extracted State code identifier.

8. The method of claim 7, wherein the method further comprises providing a database maintaining a listing of State code identifiers and associated formatting information, and further wherein determining a format of the first driver license machine readable information includes:

matching the extracted State code identifier with a State code identifier in the database; and designating the format associated with the matched State identifier in the database as the machine readable information format of the first driver license.

9. The method of claim 8, wherein for at least one of the State code identifiers in the database, a plurality of versions are provided each having an associated format, and further wherein determining a format of the first driver license machine readable information includes:

determining whether the extracted State code identifier corresponds with a State code identifier in the database having a plurality of versions;

determining a version of the first driver license based upon the machine readable information; and matching the extracted State code identifier and the determined version with a State code identifier and version provided by the database.

10. The method of claim 7, wherein extracting a State code identifier includes:

identifying a sentinel in the first track data stream; and identifying the state code identifier based upon the identified sentinel.

11. The method of claim 6, wherein the machine readable information is stored on the first driver license in a plurality of tracks including a first track having a first track data stream, and further wherein parsing the first customer identification information includes:

identifying positions of sentinels and delimiters in the first track data stream;

comparing the identified sentinel and delimiter positions within the first track data stream with the determined format; and identifying customer name information in the first track data stream based upon the comparison.

12. The method of claim 11, wherein identifying customer name information includes identifying an ordering of name components in the first track data stream based upon the determined format.

13. The method of claim 1, wherein electronically parsing customer identification information includes comparing the machine readable information stored on the first driver license with information in a database, the database maintaining State identification card formatting information for at least twenty-five States of the United States of America.

14. The method of claim 1, further comprising:
electronically parsing customer address information from the machine readable information retrieved from the first license;
wherein the electronically generated first customer quasi-cash document information includes the electronically parsed customer address information such that the printed first quasi-cash document includes the customer address.

15. The method of claim 1, further comprising:
electronically parsing customer identification card number information from the machine readable information retrieved from the first driver license;
wherein the electronically generated first customer quasi-cash document information includes the electronically parsed customer identification card number.

16. The method of claim 1, wherein the first quasi-cash document is selected from the group consisting of a check and a money order.

17. The method of claim 1, further comprising:
prior to printing the first quasi-cash document, visually displaying the generated first customer quasi-cash document information; and
manually confirming that the generated first customer quasi-cash document information is correct.

18. The method of claim 1, wherein the machine readable information is stored on the first driver license by a storage means selected from the group consisting of magnetic stripe, integrated circuit, finger imaging, optical memory, bar code, and digital image.

19. The method of claim 1, wherein the method is performed within a casino.

20. The method of claim 1, wherein the machine readable information stored on the first driver license is characterized by the absence of monetary information.

21. The method of claim 1, wherein the machine readable information stored on the first driver license is not associated with a financial institution.

22. The method of claim 1, wherein the machine readable information stored on the first driver license is insufficient alone to perform electronic financial transactions.

23. The method of claim 1, wherein the machine readable information stored on the first driver license is characterized by the absence of financial account information.

24. The method of claim 1, wherein the first quasi-cash document represents a cash advance from a financial account owned by the first customer.

25. The method of claim 1, further comprising:
subtracting money from a financial account owned by the first customer in conjunction with printing of the first quasi-cash document.

26. A system for performing quasi-cash transactions for customers, the system comprising:
a card reader adapted to read and decode machine readable information stored on driver licenses issued by States of the United States of America, including first and second driver licenses having differing machine readable information formatting;
a processor electronically connected to the card reader and adapted to:
receive information from a particular customer relating to a desired transaction dollar amount,
receive the machine readable information retrieved by the card reader from a driver license provided by the particular customer,
parse customer identification information from the received machine readable information,
generate quasi-cash document information utilizing the desired dollar amount and at least a portion of the parsed customer identification information; and
a printer electronically connected to the processor and adapted to print a quasi-cash document based upon the quasi-cash document information generated by the processor.

27. The system of claim 26, wherein the processor is further adapted to determine a format of the machine readable information associated with a particular driver license.

28. The system of claim 27, wherein the machine readable information is stored on the particular customer's driver license in a plurality of tracks, including a first track having a first track data stream, and further wherein the processor is further adapted to:
extract a State code identifier from the first track data stream; and
designate a format of the machine readable information based upon the extracted State code identifier.

29. The system of claim 28, wherein the processor includes a database maintaining a listing of State code identifiers and associated formatting information, and further wherein the processor is further adapted to:
match the extracted State code identifier with a State code identifier in the database; and
designate the format associated with the matched State code identifier in the database as the machine readable information format of the particular customer's driver license.

30. The system of claim 27, wherein the machine readable information is stored on the particular customer's driver license in a plurality of tracks including a first track having a first track data stream, and further wherein the processor is further adapted to:
identify positions of sentinels and delimiters in the first track data stream;
compare the identified sentinel and delimiter positions with the determined format; and
identify customer name information in the first track data stream based upon the comparison.

31. The system of claim 30, wherein the processor is further adapted to:
identify proper ordering of name components in the first track data stream based upon the comparison.

32. The system of claim 31, wherein the processor is further adapted to identify ordering of first, middle, and last name components in the first track data stream.

33. The system of claim 26, wherein the processor is further adapted to:
parse customer address information from the received machine readable information; and
generate the quasi-cash document information to include the parsed customer address.

34. The system of claim 26, wherein the processor is further adapted to:

parse customer identification card number from the received machine readable information; and generate the quasi-cash document information to include the parsed customer identification card number.

35. The system of claim 26, wherein the quasi-cash document is selected from the group consisting of a check and a money order.

36. The system of claim 26, further comprising:

a display electrically connected to the processor for visually displaying the generated quasi-cash document information.

37. The system of claim 26, wherein the card reader is adapted to read and decode machine readable information stored in a manner selected from the group consisting of magnetic stripe, integrated circuit, finger imaging, optical memory, bar code, and digital image.

38. A method of performing a quasi-cash transaction for a customer in a casino, the method comprising:

receiving information from the customer relating to a desired transaction dollar amount;

delivering a driver license, issued by a State of the United States of America to the customer, from the customer to a casino designee;

operating a card reader to retrieve machine readable information stored on the driver license, wherein a format of the machine readable information can be one of a multiplicity of possible formats used by States, and further wherein the casino designee performs the step of operating the card reader;

electronically parsing customer identification information from the retrieved machine readable information;

electronically generating quasi-cash document information utilizing the desired dollar amount and at least a portion of the electronically parsed customer identification information;

printing a quasi-cash document that displays the generated quasi-cash document information; and delivering the quasi-cash document to the customer, wherein the casino designee performs the step of delivering the document.

39. The method of claim 38, further comprising:

a) executing the printed quasi-cash document by the customer; and b) exchanging the executed quasi-cash document for a negotiable instrument.

40. The method of claim 38, further comprising:

receiving information from a second customer relating to a second desired transaction dollar amount of a second transaction;

electronically processing a second driver license issued to the second customer to retrieve machine readable information, wherein the machine readable information of the second driver license includes an identification formatting differing from that of the first driver license;

electronically parsing second customer identification information from the machine readable information of the second driver license;

electronically generating second quasi-cash document information utilizing the second desired transaction amount and at least a portion of the parsed second customer identification information; and printing a second quasi-cash document that displays the generated second quasi-cash document information.

* * * * *